(12) United States Patent
Bertness

(10) Patent No.: US 7,198,510 B2
(45) Date of Patent: Apr. 3, 2007

(54) KELVIN CONNECTOR FOR A BATTERY POST

(75) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 429 days.

(21) Appl. No.: 09/993,468

(22) Filed: Nov. 14, 2001

(65) Prior Publication Data

US 2003/0092308 A1    May 15, 2003

(51) Int. Cl.
*H01R 3/00*    (2006.01)
(52) U.S. Cl. .................. 439/500; 439/754; 439/883
(58) Field of Classification Search .............. 439/388, 439/426, 433, 440, 500, 504, 522, 627, 722, 439/726, 754, 755, 756, 759, 761, 763, 774, 439/883
See application file for complete search history.

(56) References Cited

U.S. PATENT DOCUMENTS

| | | | |
|---|---|---|---|
| 2,000,665 A * | 5/1935 | Neal | 439/440 |
| 2,514,745 A | 7/1950 | Dalzell | |
| 3,356,936 A | 12/1967 | Smith | |
| 3,562,634 A | 2/1971 | Latner | |
| 3,593,099 A | 7/1971 | Scholl | |
| 3,607,673 A | 9/1971 | Seyl | |
| 3,676,770 A | 7/1972 | Sharaf et al. | |
| 3,729,989 A | 5/1973 | Little | |
| 3,753,094 A | 8/1973 | Furuishi et al. | |
| 3,796,124 A * | 3/1974 | Crosa | 411/521 |
| 3,808,522 A | 4/1974 | Sharaf | |
| 3,811,089 A | 5/1974 | Strezelewicz | |
| 3,873,911 A | 3/1975 | Champlin | |
| 3,876,931 A | 4/1975 | Godshalk | |
| 3,886,443 A | 5/1975 | Miyakawa et al. | |
| 3,889,248 A | 6/1975 | Ritter | |
| 3,906,329 A | 9/1975 | Bader | |
| 3,909,708 A | 9/1975 | Champlin | |
| 3,936,744 A | 2/1976 | Perlmutter | |
| 3,946,299 A | 3/1976 | Christianson et al. | |
| 3,947,757 A | 3/1976 | Grube et al. | |

(Continued)

FOREIGN PATENT DOCUMENTS

DE    29 26 716 B1    1/1981

(Continued)

OTHER PUBLICATIONS

"Alligator Clips with Wire Penetrators" *J.S. Popper, Inc.* product information, downloaded from http://www.jspopper.com/, undated.

(Continued)

*Primary Examiner*—James R. Harvey
(74) *Attorney, Agent, or Firm*—Westman, Champlin & Kelly

(57) ABSTRACT

A Kelvin connector for coupling to a post of a battery includes a first contact having a surface which at least partially conforms to and is adapted to engage and electrically connect to a surface of the post. The connector also includes a second contact having a surface which at least partially conforms to and is adapted to engage and electrically connect to the surface of the post. An electrical insulator between the first contact and the second contact urges the surface of the first contact and the surface of the second contact against the surface of the post and thereby forms a Kelvin connection to the post.

7 Claims, 8 Drawing Sheets

U.S. PATENT DOCUMENTS

| | | |
|---|---|---|
| 3,969,667 A | 7/1976 | McWilliams |
| 3,979,664 A | 9/1976 | Harris |
| 3,984,762 A | 10/1976 | Dowgiallo, Jr. |
| 3,984,768 A | 10/1976 | Staples |
| 3,989,544 A | 11/1976 | Santo |
| 4,008,619 A | 2/1977 | Alcaide et al. |
| 4,023,882 A * | 5/1977 | Pettersson .................. 439/426 |
| 4,024,953 A | 5/1977 | Nailor, III |
| 4,047,091 A | 9/1977 | Hutchines et al. ............ 363/59 |
| 4,053,824 A | 10/1977 | Dupuis et al. |
| 4,070,624 A | 1/1978 | Taylor |
| 4,086,531 A | 4/1978 | Bernier |
| 4,112,351 A | 9/1978 | Back et al. |
| 4,114,083 A | 9/1978 | Benham et al. |
| 4,126,874 A | 11/1978 | Suzuki et al. |
| 4,178,546 A | 12/1979 | Hulls et al. |
| 4,193,025 A | 3/1980 | Frailing et al. |
| 4,207,611 A | 6/1980 | Gordon |
| 4,217,645 A | 8/1980 | Barry et al. |
| 4,297,639 A | 10/1981 | Branham ................... 324/429 |
| 4,315,204 A | 2/1982 | Sievers et al. |
| 4,316,185 A | 2/1982 | Watrous et al. |
| 4,322,685 A | 3/1982 | Frailing et al. |
| 4,351,405 A | 9/1982 | Fields et al. .................. 180/65 |
| 4,361,809 A | 11/1982 | Bil et al. ..................... 324/426 |
| 4,363,407 A | 12/1982 | Barkler et al. |
| 4,369,407 A | 1/1983 | Korbell |
| 4,379,989 A | 4/1983 | Kurz et al. |
| 4,379,990 A | 4/1983 | Sievers et al. |
| 4,390,828 A | 6/1983 | Converse et al. |
| 4,392,101 A | 7/1983 | Saar et al. |
| 4,396,880 A | 8/1983 | Windebank |
| 4,408,157 A | 10/1983 | Beaubien |
| 4,412,169 A | 10/1983 | Dell'Orto |
| 4,423,378 A | 12/1983 | Marino et al. |
| 4,423,379 A | 12/1983 | Jacobs et al. |
| 4,424,491 A | 1/1984 | Bobbett et al. |
| 4,459,548 A | 7/1984 | Lentz et al. |
| 4,514,694 A | 4/1985 | Finger |
| 4,520,353 A | 5/1985 | McAuliffe |
| 4,633,418 A | 12/1986 | Bishop |
| 4,659,977 A | 4/1987 | Kissel et al. |
| 4,663,580 A | 5/1987 | Wortman ..................... 320/35 |
| 4,665,370 A | 5/1987 | Holland ...................... 324/429 |
| 4,667,143 A | 5/1987 | Cooper et al. ................ 320/22 |
| 4,667,279 A | 5/1987 | Maier |
| 4,678,998 A | 7/1987 | Muramatsu |
| 4,679,000 A | 7/1987 | Clark |
| 4,680,528 A | 7/1987 | Mikami et al. |
| 4,697,134 A | 9/1987 | Burkum et al. |
| 4,707,795 A | 11/1987 | Alber et al. |
| 4,709,202 A | 11/1987 | Koenck et al. |
| 4,710,861 A | 12/1987 | Kanner |
| 4,719,428 A | 1/1988 | Liebermann |
| 4,743,855 A | 5/1988 | Randin et al. |
| 4,745,349 A | 5/1988 | Palanisamy et al. |
| 4,816,768 A | 3/1989 | Champlin |
| 4,820,966 A | 4/1989 | Fridman |
| 4,825,170 A | 4/1989 | Champlin |
| 4,847,547 A | 7/1989 | Eng, Jr. ....................... 320/35 |
| 4,849,700 A | 7/1989 | Morioka et al. |
| 4,876,495 A | 10/1989 | Palanisamy et al. |
| 4,881,038 A | 11/1989 | Champlin |
| 4,912,416 A | 3/1990 | Champlin |
| 4,913,116 A | 4/1990 | Katogi et al. |
| 4,929,931 A | 5/1990 | McCuen |
| 4,931,738 A | 6/1990 | MacIntyre et al. |
| 4,937,528 A | 6/1990 | Palanisamy |
| 4,947,124 A | 8/1990 | Hauser |
| 4,956,597 A | 9/1990 | Heavey et al. |
| 4,968,941 A | 11/1990 | Rogers |
| 4,968,942 A | 11/1990 | Palanisamy |
| 5,004,979 A | 4/1991 | Marino et al. |
| 5,032,825 A | 7/1991 | Xuznicki |
| 5,037,778 A | 8/1991 | Stark et al. .................. 437/216 |
| 5,047,722 A | 9/1991 | Wurst et al. |
| 5,087,881 A | 2/1992 | Peacock |
| 5,095,223 A | 3/1992 | Thomas ...................... 307/110 |
| 5,108,320 A * | 4/1992 | Kimber ...................... 439/883 |
| 5,126,675 A | 6/1992 | Yang |
| 5,140,269 A | 8/1992 | Champlin |
| 5,144,218 A | 9/1992 | Bosscha |
| 5,144,248 A | 9/1992 | Alexandres et al. |
| 5,160,881 A | 11/1992 | Schramm et al. |
| 5,170,124 A | 12/1992 | Blair et al. |
| 5,179,335 A | 1/1993 | Nor |
| 5,194,799 A | 3/1993 | Tomantschger ................ 320/2 |
| 5,204,611 A | 4/1993 | Nor et al. |
| 5,214,370 A | 5/1993 | Harm et al. |
| 5,214,385 A | 5/1993 | Gabriel et al. |
| 5,241,275 A | 8/1993 | Fang |
| 5,254,952 A | 10/1993 | Salley et al. |
| 5,266,880 A | 11/1993 | Newland |
| 5,281,919 A | 1/1994 | Palanisamy |
| 5,281,920 A | 1/1994 | Wurst |
| 5,295,078 A | 3/1994 | Stich et al. |
| 5,298,797 A | 3/1994 | Redl |
| 5,300,874 A | 4/1994 | Shimamoto et al. |
| 5,302,902 A | 4/1994 | Groehl |
| 5,315,287 A | 5/1994 | Sol |
| 5,321,626 A | 6/1994 | Palladino |
| 5,331,268 A | 7/1994 | Patino et al. |
| 5,336,993 A | 8/1994 | Thomas et al. |
| 5,338,515 A | 8/1994 | Dalla Betta et al. |
| 5,339,018 A | 8/1994 | Brokaw |
| 5,343,380 A | 8/1994 | Champlin |
| 5,347,163 A | 9/1994 | Yoshimura |
| 5,352,968 A | 10/1994 | Reni et al. |
| 5,365,160 A | 11/1994 | Leppo et al. |
| 5,365,453 A | 11/1994 | Startup et al. |
| 5,381,096 A | 1/1995 | Hirzel |
| 5,412,323 A | 5/1995 | Kato et al. |
| 5,426,371 A | 6/1995 | Salley et al. |
| 5,426,416 A | 6/1995 | Jefferies et al. |
| 5,432,426 A | 7/1995 | Yoshida |
| 5,434,495 A | 7/1995 | Toko |
| 5,435,185 A | 7/1995 | Eagan ......................... 73/587 |
| 5,442,274 A | 8/1995 | Tamai |
| 5,445,026 A | 8/1995 | Eagan ......................... 73/591 |
| 5,449,996 A | 9/1995 | Matsumoto et al. |
| 5,449,997 A | 9/1995 | Gilmore et al. |
| 5,451,881 A | 9/1995 | Finger |
| 5,453,027 A * | 9/1995 | Buell et al. .................. 439/433 |
| 5,457,377 A | 10/1995 | Jonsson |
| 5,469,043 A | 11/1995 | Cherng et al. |
| 5,485,090 A | 1/1996 | Stephens |
| 5,488,300 A | 1/1996 | Jamieson |
| 5,519,383 A | 5/1996 | De La Rosa |
| 5,528,148 A | 6/1996 | Rogers |
| 5,537,967 A | 7/1996 | Tashiro et al. |
| 5,546,317 A | 8/1996 | Andrieu |
| 5,548,273 A | 8/1996 | Nicol et al. |
| 5,550,485 A | 8/1996 | Falk |
| 5,561,380 A | 10/1996 | Sway-Tin et al. |
| 5,562,501 A | 10/1996 | Kinoshita et al. |
| 5,572,136 A | 11/1996 | Champlin |
| 5,574,355 A | 11/1996 | McShane et al. ............. 320/39 |
| 5,583,416 A | 12/1996 | Klang |
| 5,585,728 A | 12/1996 | Champlin |
| 5,589,757 A | 12/1996 | Klang |
| 5,592,093 A | 1/1997 | Klingbiel |
| 5,596,260 A | 1/1997 | Moravec et al. |
| 5,598,098 A | 1/1997 | Champlin |
| 5,602,462 A | 2/1997 | Stich et al. |

| | | |
|---|---|---|
| 5,606,242 A | 2/1997 | Hull et al. |
| 5,621,298 A | 4/1997 | Harvey |
| 5,633,985 A | 5/1997 | Severson et al. |
| 5,637,978 A | 6/1997 | Kellett et al. ................... 320/2 |
| 5,642,031 A | 6/1997 | Brotto |
| 5,650,937 A | 7/1997 | Bounaga |
| 5,652,501 A | 7/1997 | McClure et al. |
| 5,653,659 A | 8/1997 | Kunibe et al. ............... 477/111 |
| 5,656,920 A | 8/1997 | Cherng et al. |
| 5,675,234 A | 10/1997 | Greene |
| 5,677,077 A | 10/1997 | Faulk |
| 5,699,050 A | 12/1997 | Kanazawa |
| 5,701,089 A | 12/1997 | Perkins |
| 5,705,929 A | 1/1998 | Caravello et al. |
| 5,710,503 A | 1/1998 | Sideris et al. |
| 5,711,648 A | 1/1998 | Hammerslag ................ 414/786 |
| 5,717,336 A | 2/1998 | Basell et al. |
| 5,717,937 A | 2/1998 | Fritz |
| 5,739,667 A | 4/1998 | Matsuda et al. |
| 5,747,909 A | 5/1998 | Syverson et al. |
| 5,754,417 A | 5/1998 | Nicollini ...................... 363/60 |
| 5,757,192 A | 5/1998 | McShane et al. |
| 5,760,587 A | 6/1998 | Harvey |
| 5,773,978 A | 6/1998 | Becker |
| 5,789,899 A | 8/1998 | van Phuoc et al. |
| 5,793,359 A | 8/1998 | Ushikubo |
| 5,808,469 A | 9/1998 | Kopera |
| 5,818,234 A | 10/1998 | McKinnon ................... 324/433 |
| 5,821,756 A | 10/1998 | McShane et al. |
| 5,825,174 A | 10/1998 | Parker |
| 5,831,435 A | 11/1998 | Troy |
| 5,862,515 A | 1/1999 | Kobayashi et al. |
| 5,865,638 A * | 2/1999 | Trafton ....................... 439/288 |
| 5,872,443 A | 2/1999 | Williamson |
| 5,895,440 A | 4/1999 | Proctor et al. |
| 5,914,605 A | 6/1999 | Bertness |
| 5,927,938 A | 7/1999 | Hammerslag ................ 414/809 |
| 5,929,609 A | 7/1999 | Joy et al. |
| 5,939,855 A | 8/1999 | Proctor et al. |
| 5,939,861 A | 8/1999 | Joko et al. |
| 5,945,829 A | 8/1999 | Bertness |
| 5,951,229 A | 9/1999 | Hammerslag ................ 414/398 |
| 5,961,561 A | 10/1999 | Wakefield, II ................ 701/29 |
| 5,961,604 A | 10/1999 | Anderson et al. ............ 709/229 |
| 5,969,625 A | 10/1999 | Russo |
| 6,002,238 A | 12/1999 | Champlin |
| 6,008,652 A | 12/1999 | Theofanopoulos et al. |
| 6,009,369 A | 12/1999 | Boisvert et al. |
| 6,031,354 A | 2/2000 | Wiley et al. |
| 6,037,751 A | 3/2000 | Klang |
| 6,037,777 A | 3/2000 | Champlin |
| 6,051,976 A | 4/2000 | Bertness |
| 6,072,299 A | 6/2000 | Kurie et al. |
| 6,072,300 A | 6/2000 | Tsuji |
| 6,081,098 A | 6/2000 | Bertness et al. |
| 6,091,245 A | 7/2000 | Bertness |
| 6,094,033 A | 7/2000 | Ding et al. |
| 6,104,167 A | 8/2000 | Bertness et al. |
| 6,114,834 A | 9/2000 | Parise |
| 6,137,269 A | 10/2000 | Champlin |
| 6,140,797 A | 10/2000 | Dunn .......................... 320/105 |
| 6,144,185 A | 11/2000 | Dougherty et al. ......... 320/132 |
| 6,150,793 A | 11/2000 | Lesesky et al. |
| 6,161,640 A | 12/2000 | Yamaguchi ................ 180/65.8 |
| 6,163,156 A | 12/2000 | Bertness |
| 6,172,483 B1 | 1/2001 | Champlin |
| 6,172,505 B1 | 1/2001 | Bertness |
| 6,181,545 B1 | 1/2001 | Amatucci et al. ........... 361/502 |
| 6,222,369 B1 | 4/2001 | Champlin |
| 6,225,808 B1 | 5/2001 | Varghese et al. |
| 6,236,332 B1 | 5/2001 | Conkright et al. ..... 340/825.06 |
| 6,249,124 B1 | 6/2001 | Bertness |
| 6,250,973 B1 | 6/2001 | Lowery et al. |
| 6,254,438 B1 | 7/2001 | Gaunt |
| 6,259,254 B1 | 7/2001 | Klang |
| 6,262,563 B1 | 7/2001 | Champlin |
| 6,294,896 B1 | 9/2001 | Champlin |
| 6,294,897 B1 | 9/2001 | Champlin |
| 6,304,087 B1 | 10/2001 | Bertness ...................... 324/426 |
| 6,310,481 B2 | 10/2001 | Bertness ...................... 324/430 |
| 6,313,607 B1 | 11/2001 | Champlin ................... 320/132 |
| 6,313,608 B1 | 11/2001 | Varghese et al. ............ 320/132 |
| 6,316,914 B1 | 11/2001 | Bertness ...................... 320/134 |
| 6,323,650 B1 | 11/2001 | Bertness et al. ............. 324/426 |
| 6,329,793 B1 | 12/2001 | Bertness et al. ............. 320/132 |
| 6,331,762 B1 | 12/2001 | Bertness ...................... 320/134 |
| 6,332,113 B1 | 12/2001 | Bertness ........................ 702/63 |
| 6,346,795 B2 | 2/2002 | Haraguchi et al. .......... 320/136 |
| 6,347,958 B1 | 2/2002 | Tsai ............................ 439/488 |
| 6,351,102 B1 | 2/2002 | Troy ........................... 320/139 |
| 6,359,441 B1 | 3/2002 | Bertness ...................... 324/426 |
| 6,363,303 B1 | 3/2002 | Bertness ........................ 701/29 |

FOREIGN PATENT DOCUMENTS

| | | |
|---|---|---|
| EP | 0 022 450 A1 | 1/1981 |
| EP | 0 637 754 A1 | 2/1995 |
| EP | 0 772 056 A1 | 5/1997 |
| FR | 2 749 397 | 12/1997 |
| GB | 2 088 159 A | 6/1982 |
| JP | 59-17892 | 1/1984 |
| JP | 59-17893 | 1/1984 |
| JP | 59-17894 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04131779 | 5/1992 |
| JP | 04372536 | 12/1992 |
| JP | 5216550 | 8/1993 |
| JP | 7-128414 | 5/1995 |
| WO | WO 93/22666 | 11/1993 |
| WO | WO 94/05069 | 3/1994 |
| WO | WO 95/58270 | 12/1998 |
| WO | WO 99/23738 | 5/1999 |

OTHER PUBLICATIONS

"#12: LM78S40 Simple Switcher DC to DC Converter", *ITM e-Catalog*, downloaded from http://www.pcbcafe.com, undated.

"Simple DC—DC Converts Allows Use of Single Battery", *Electronix Express*, downloaded from http://www.elexp.com/t_dc-dc.htm., undated.

"DC—DC Converter Basics", *Power Designers*, downloaded from http://www.powederdesigners.com/InforWeb.design_center/articles/DC—DC/converter.shtm, undated.

"Electrochemical Impedance Spectroscopy in Battery Development and Testing", *Batteries International*, Apr. 1997, pp. 59 and 62-63.

"Battery Impedance", by E. Willihnganz et al., *Electrical Engineering*, Sep. 1959, pp. 922-925.

"Determining The End of Battery Life", by S. DeBardelaben, *IEEE*, 1986, pp. 365-368.

"A Look at the Impedance of a Cell", by S. Debardelaben, *IEEE*, 1988, pp. 394-397.

"The Impedance of Electrical Storage Cells", by N.A. Hampson et al., *Journal of Applied Electrochemistry*, 1980, pp. 3-11.

"A Package for Impedance/Admittance Data Analysis", by B. Boukamp, *Solid State Ionics*, 1986, pp. 136-140.

"Precision of Impedance Spectroscopy Estimates of Bulk, Reaction Rate, and Diffusion Parameters", by J. Macdonald et al., *J. Electroanal, Chem.*, 1991, pp. 1-11.

Internal Resistance: Harbinger of Capacity Loss in Starved Electrolyte Sealed Lead Acid Batteries, by Vaccaro, F.J. et al., *AT & T Bell Laboratories,* 1987 IEEE, Ch. 2477, pp. 128, 131.

IEEE Recommended Practice For Maintenance, Testings, and Replacement of Large Lead Storage Batteries for Generating Stations and Substations, *The Institute of Electrical and Electronics Engineers, Inc., ANSI/IEEE Std.* 450-1987, Mar. 9, 1987, pp. 7-15.

"Field and Laboratory Studies to Assess the State of Health of Valve-Regulated Lead Acid Batteries: Part I Conductance/Capacity Correlation Studies", by D. Feder et al., *IEEE,* Aug. 1992, pp. 218-233.

"Battery Impedance", by E. Willihnganz et al., *Electrical Engineering,* Sep. 1959, pp. 922-925.

"JIS Japanese Industrial Standard-Lead Acid Batteries for Automobiles", *Japanese Standards Association UDC,* 621.355.2:629.113. 006, Nov. 1995.

"Performance of Dry Cells", by C. Hambuechen, Preprint of *Am. Electrochem. Soc.,* Apr. 18-20, 1912, paper No. 19, pp. 1-5.

"A Bridge for Measuring Storage Battery Resistance", by E. Willihncanz, *The Electrochemical Society,* preprint 79-20, Apr. 1941, pp. 253-258.

National Semiconductor Corporation, "High Q Notch Filter", Mar. 1969, Linear Brief 5.

Burr-Brown Corporation, "Design A 60 Hz Notch Filter with the UAF42", Jan. 1994, AB-071.

National Semiconductor Corporation, "LMF90-$4^{th}$-Order Elliptic Notch Filter", Dec. 1994, RRD-B30M115.

* cited by examiner

KELVIN CONNECTOR FOR A BATTERY POST

BACKGROUND OF THE INVENTION

The present invention generally relates to storage batteries. More specifically, the present invention relates to a Kelvin connector for engaging a battery post.

Storage batteries, such as lead acid storage batteries of the type used in the automotive industry, have existed for many years. However, understanding the nature of such storage batteries, how such storage batteries operate and how to accurately test such batteries has been an ongoing endeavor and has proved quite difficult. Storage batteries consist of a plurality of individual storage cells electrically connected in series. Typically, each cell has a voltage potential of about 2.1 volts. By connecting the cells in series, the voltage of the individual cells are added in a cumulative manner. For example, in a typical automotive storage battery, six storage cells are used to provide a total voltage when the battery is fully charged up to 12.6 volts.

Several techniques have been used to test the condition of storage batteries. These techniques include a voltage test to determine if the battery voltage is below a certain threshold, and a load test that involves discharging a battery using a known load. A more recent technique involves measuring the conductance of the storage batteries. This technique typically involves the use of Kelvin connections for the testing equipment. A Kelvin connection is a four point connection technique that allows current to be injected into a battery through a first pair of connectors attached to the battery posts, while a second pair of connectors is attached to the battery posts in order to measure the voltage across the posts. Typically, a pair of pivoting jaw-type battery clamps are respectively clamped to the battery posts and are designed to continue the circuit that includes the Kelvin connection. The jaws of each clamp are electrically isolated from each other. Pivoting jaw-type clamps provide tenuous mechanical and electrical connections to the battery contacts and could easily inadvertently fall off. Thus, pivoting jaw-type battery clamps are usually suitable only for temporarily connecting test equipment to battery contacts. Pivoting jaw-type clamps are not suitable for use with test modules that are integrated with the storage batteries and require relatively permanent connections to the battery posts.

SUMMARY OF THE INVENTION

A Kelvin connector for coupling to a post of a battery includes a first contact having a surface which at least partially conforms to and is adapted to engage and electrically connect to a surface of the post. The connector also includes a second contact having a surface which at least partially conforms to and is adapted to engage and electrically connect to the surface of the post. An electrical insulator between the first contact and the second contact urges the surface of the first contact and the surface of the second contact against the surface of the post and thereby forms a Kelvin connection to the post.

DETAILED DESCRIPTION OF THE PREFERRED EMBODIMENTS

Figure 1:
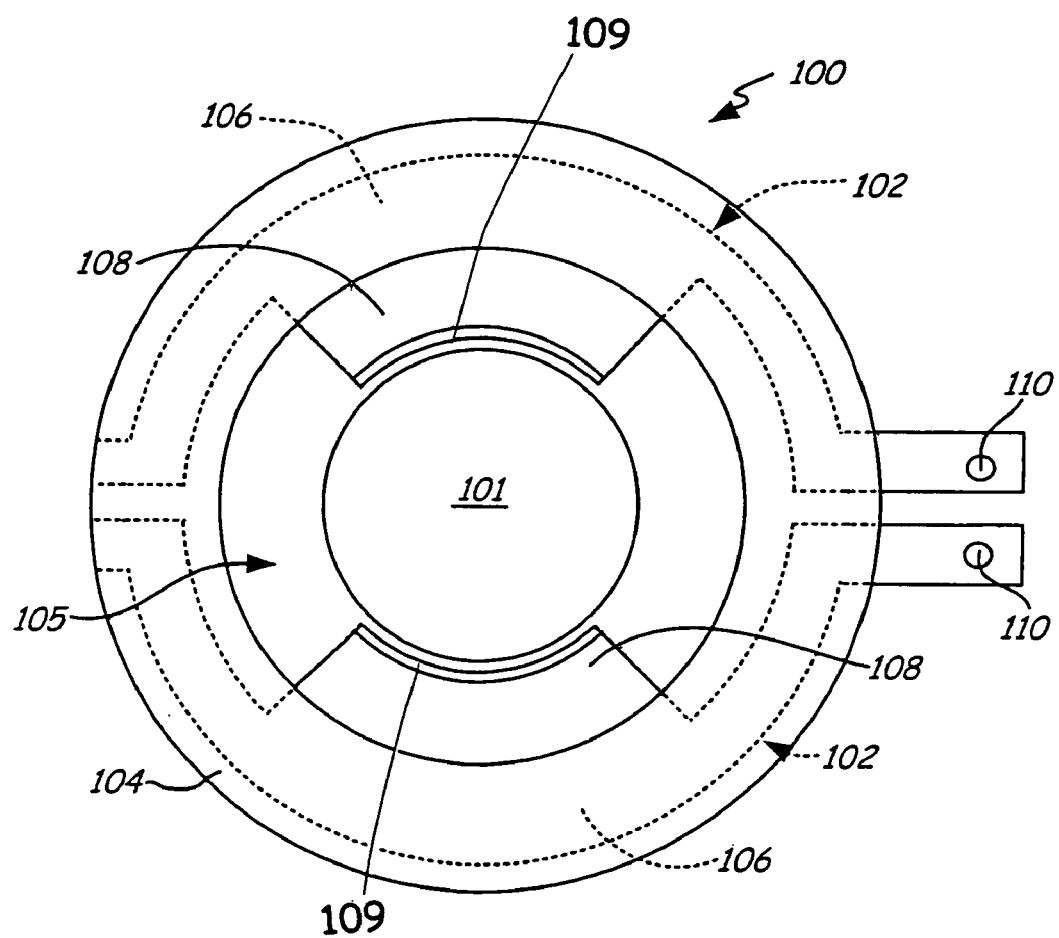
FIGS. 1 to 3 illustrate simplified block diagrams of Kelvin connector s in accordance with embodiments of the present invention.

FIG. 1 illustrates a top plan view of a Kelvin connector 100 in accordance with an embodiment of the present invention. The same reference numerals are used in the various figures to represent the same or similar elements. Kelvin connector 100 is designed to engage a battery post 101, and to electrically couple two external electrical conductors (not shown), such as conductors of a Kelvin connection, to the battery post 101. Kelvin connector 100 is designed for use on a smooth wall battery post, although it could easily be adapted for use with other kinds of posts, such as, for example, a threaded battery post.

As can be seen in FIG. 1, Kelvin connector 100 includes a pair of substantially identical opposing electrical contacts 102 (contacts facing each other) mechanically connected together but electrically insulated from one another by means of an insulator 104 that has a central opening 105. Each contact 102 includes an insulator support portion 106 and a post grasping portion 108. Each insulator support portion 106 of contacts 102 is embedded within the insulator 104. Each post grasping portion 108 extends inwardly from the insulator support portion 106 into the central opening 105 of insulator 104 and engages battery post 101 through surfaces 109. A pair of connection bars 110 that extend outwardly from contacts 102 and insulator 104 facilitate the connection of external circuitry to contacts 102. Connection bars 110 include connection grooves 112 that hold ends of external electrical conductors. The ends of external electrical conductors may be soldered to connection bars 110.

In general, each electrical contact 102 may be formed from any electrically conductive sheet metal. Preferably, electrical contacts 102 are formed from copper and solder plated before formation of Kelvin connector 100. Insulator 104 may be made of any suitable electrically insulative material such as plastic or composite material.

The opening formed by post grasping portions 108 of the opposing contacts 102 is sized to form a tight fit with the battery post 101. The opening 105 in insulator 104 is larger in diameter than the opening between grasping portions 108 and battery post 101 so as to have a substantial annular space between insulator 104 and the peripheral surface of battery post 101. Once Kelvin connector 100 is positioned over battery post 101, force is applied on connector 100 in a downward direction using, for example, a pipe having a bore that is substantially equal to the diameter of the opening 105 in insulator 104. Thus, Kelvin connector 100 is forced onto battery post 101 such that electrical contacts 102 are in tightly gripping engagement with battery post 101, thereby providing good electrical contact between post grasping portions 108 of electrical contacts 102 and battery post 101. Kelvin connectors, such as 100, are sized according to battery post diameters. Thus, a Kelvin connector for a positive post usually has a larger diameter than a Kelvin connector for a negative post since the positive battery post is typically larger in diameter than the negative battery post.

Figure 2:
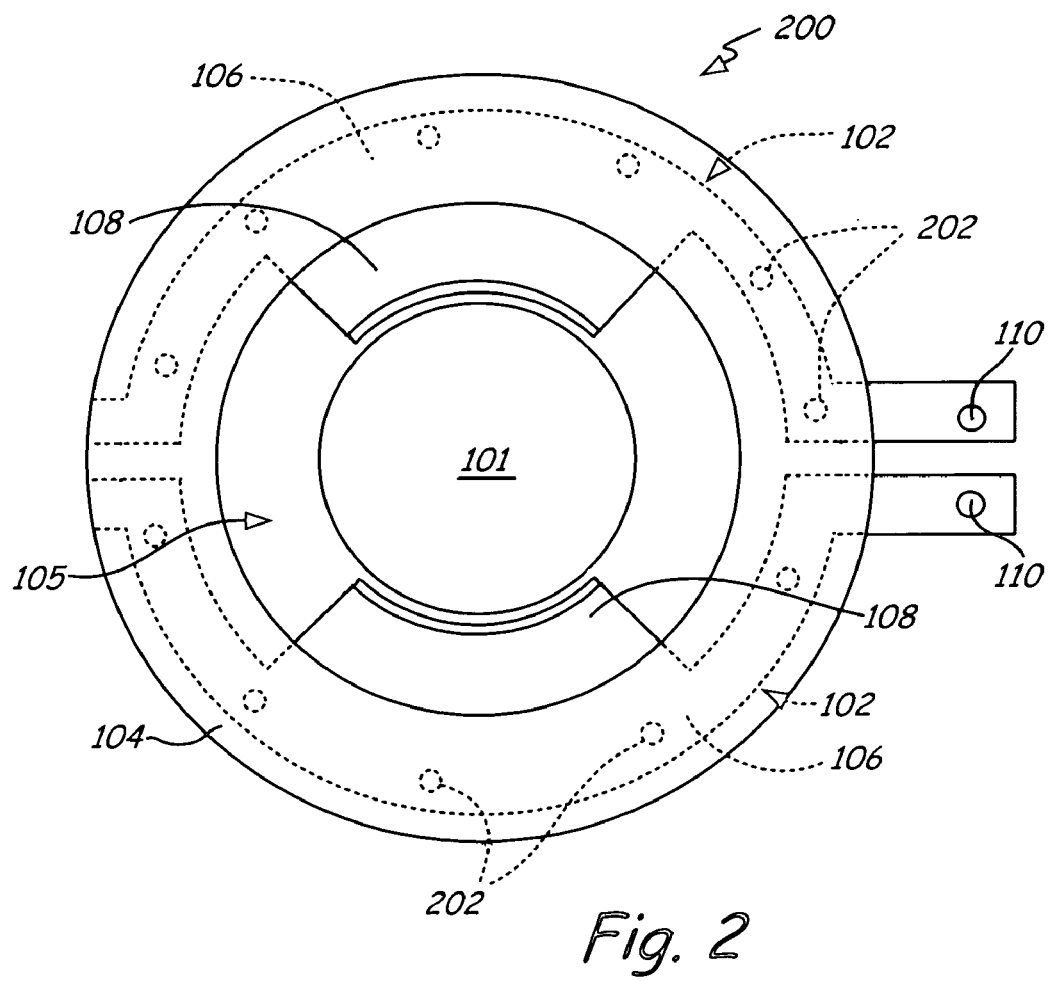

FIG. 2 illustrates a Kelvin connector 200 in accordance with another embodiment of the present invention. As can be seen in FIG. 2, insulator support portions 106 of electrical contacts 102 include a plurality of grooves 202, which are included to provide better coupling between insulator 104 and electrical contacts 102. The remaining elements of Kelvin connector 200 are similar to the elements of Kelvin connector 100 of FIG. 1. As in the case of Kelvin connector 100 (FIG. 1) described above, insulator support portions 106 of Kelvin connector 200 are also embedded within insulator 104. However, in Kelvin connector 200, portions of insulator 104 extend through grooves 202, thereby providing additional mechanical coupling between insulator 104 and electrical contacts 102. The coupling occurs during the formation of Kelvin connector 200 wherein insulator 104 flows around grooves 202 and subsequently solidifies to form a strong mechanical bond with contacts 102.

Figure 3:
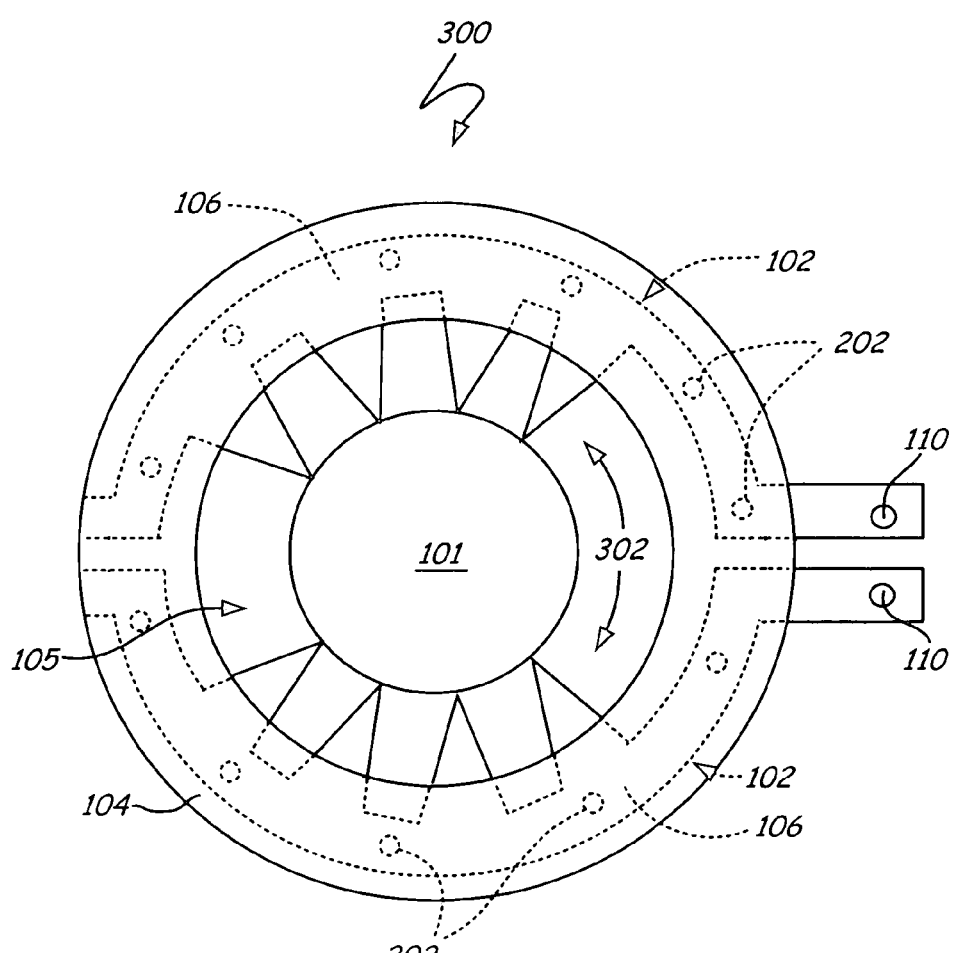

FIG. 3 illustrates a Kelvin connector 300 in accordance with another embodiment of the present invention. As can be seen in FIG. 3, post grasping portions 108 of electrical contacts 102 include a plurality of teeth or prongs 302, which are employed to grip battery post 101 instead of post grasping portions 108 with smooth contours shown in FIGS. 1 and 2. The remaining elements of Kelvin connector 300 are similar to the elements of Kelvin connector s 100 and 200 (FIGS. 1 and 2) and function as described above. Teeth 302 help resist axial removal of connector 300 from post 101 in a manner similar to a "Chinese finger trap". Teeth 302 also prevent slipping, thereby insuring proper electrical connection between electrical contacts 102 and battery post 101. Teeth 302 are shown disposed substantially in a common plane, but may extend, together or separately, in any number of different non-planer directions and may be of different shapes.

Figure 4:
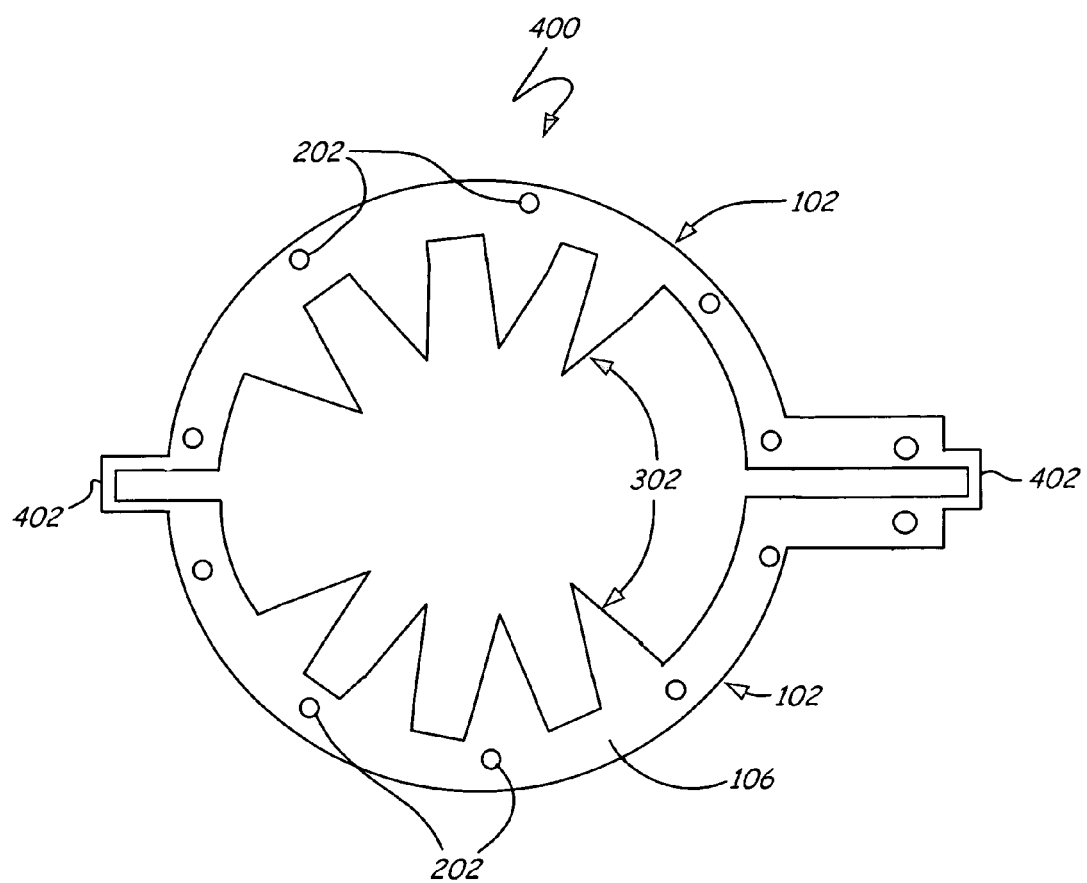
FIGS. 4 to 6 illustrate simplified block diagrams of a method of forming a Kelvin connector in accordance with an embodiment of the present invention.
Figure 5:
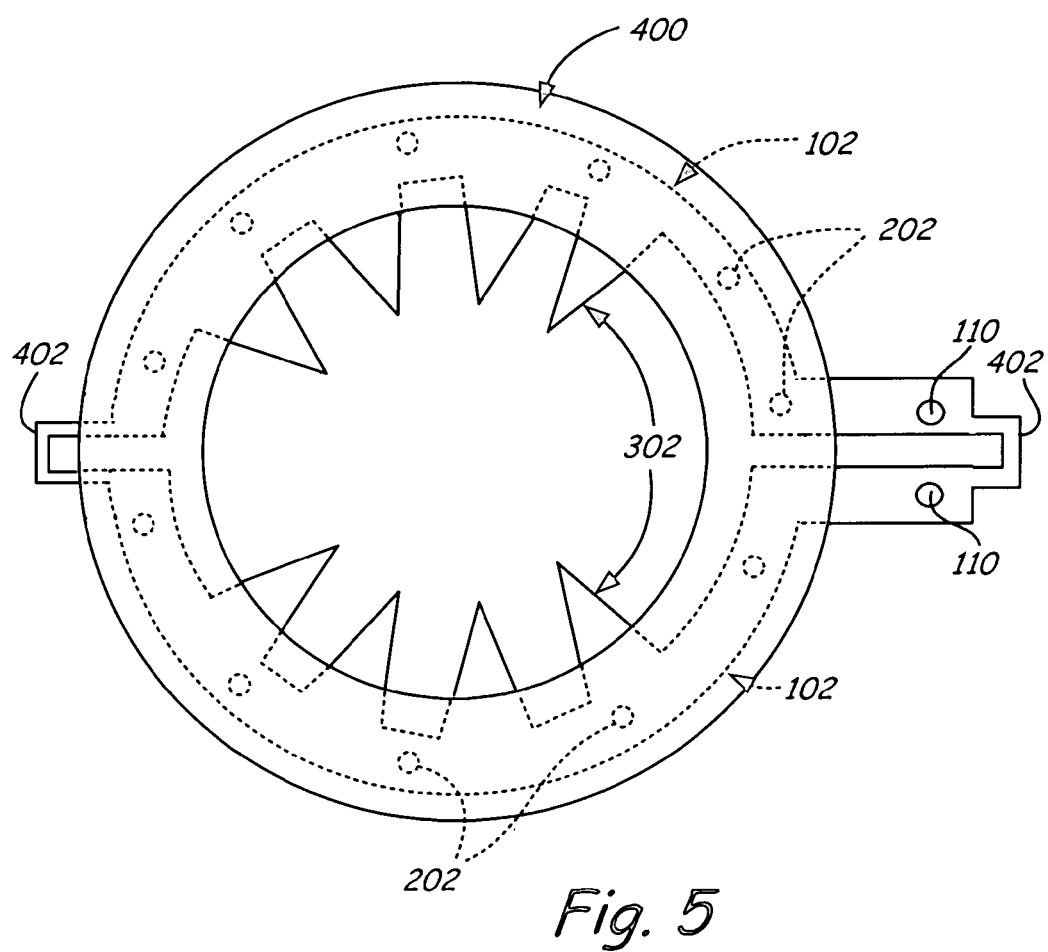
Figure 6:
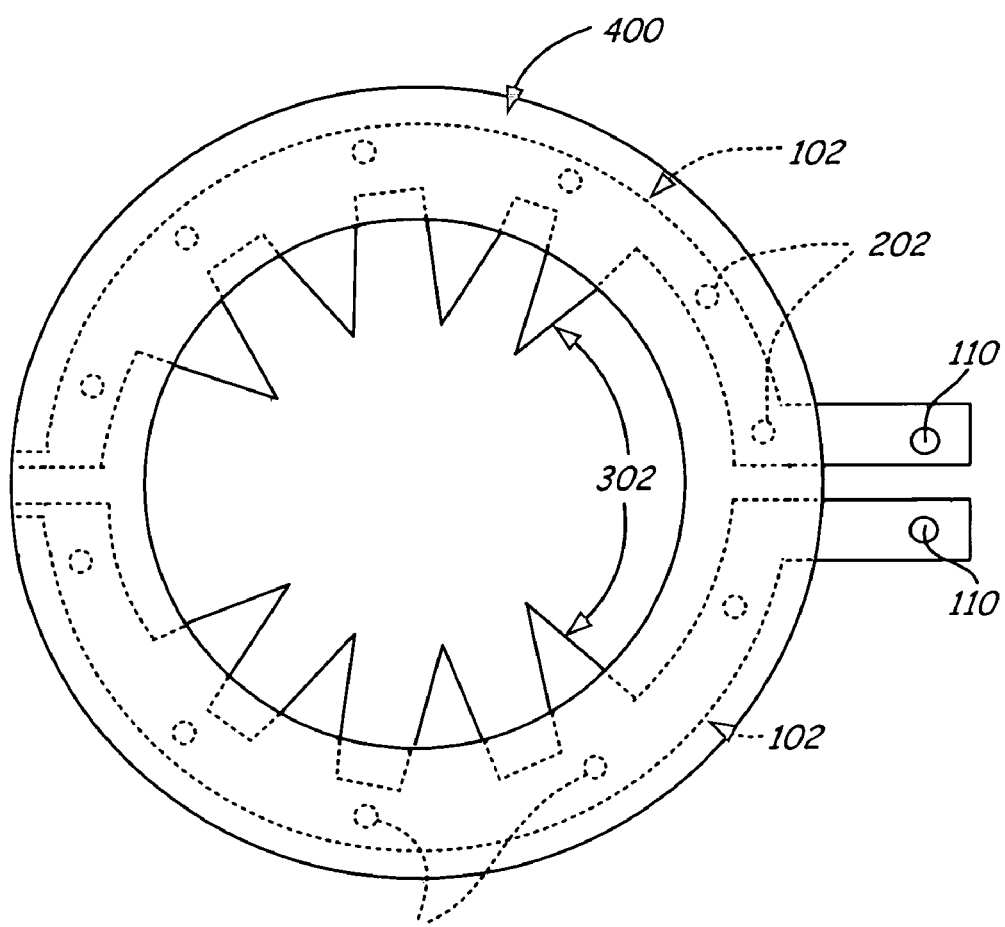

FIGS. 4, 5 and 6 collectively illustrate a method of forming a Kelvin connector in accordance with an embodiment of the present invention. The method includes providing an electrically conductive piece which is illustrated in FIG. 4. Conductive piece 400 includes a pair of opposing electrical contacts 102 coupled together by shorting bars 402. Each contact 102 includes an insulator support portion 106 and a post grasping portion 108. Each insulator support portion 106 includes a plurality of grooves 202 and each post grasping portion 108 includes a plurality of teeth 302. Contacts 102 also include connection bars 110 with connection grooves 112. Insulator 104 is formed over support portions 106 of electrical contacts 102 such that insulator 104 extends through grooves 202. In FIG. 5, conductive piece 400 is shown with support portions of contacts 102 embedded within insulator 104 after the insulator-formation process is complete. As can be seen in FIG. 5, insulator 104 is formed such that mechanical coupling between contacts 102 is provided. After formation of insulator 104, shorting bars 402 are removed from conductive piece 400 to electrically isolate contacts 102 from each other. FIG. 6 shows Kelvin connector 600 formed by the method described above. As can be seen in FIG. 6, contacts 102 remain mechanically coupled together by insulator 104 after removal of shorting bars 402.

Embodiments of the present invention, described above, are particularly useful with a storage battery having an integrated battery test module for performing a battery test on electrical cells of the storage battery. As used herein "integrated" can include a separate battery test module which is attached to the battery housing. Integrated battery testers employing Kelvin connector s to couple a Kelvin connection to battery posts in accordance with the present invention are described below in connection with FIGS. 7 and 8.

Figure 7:
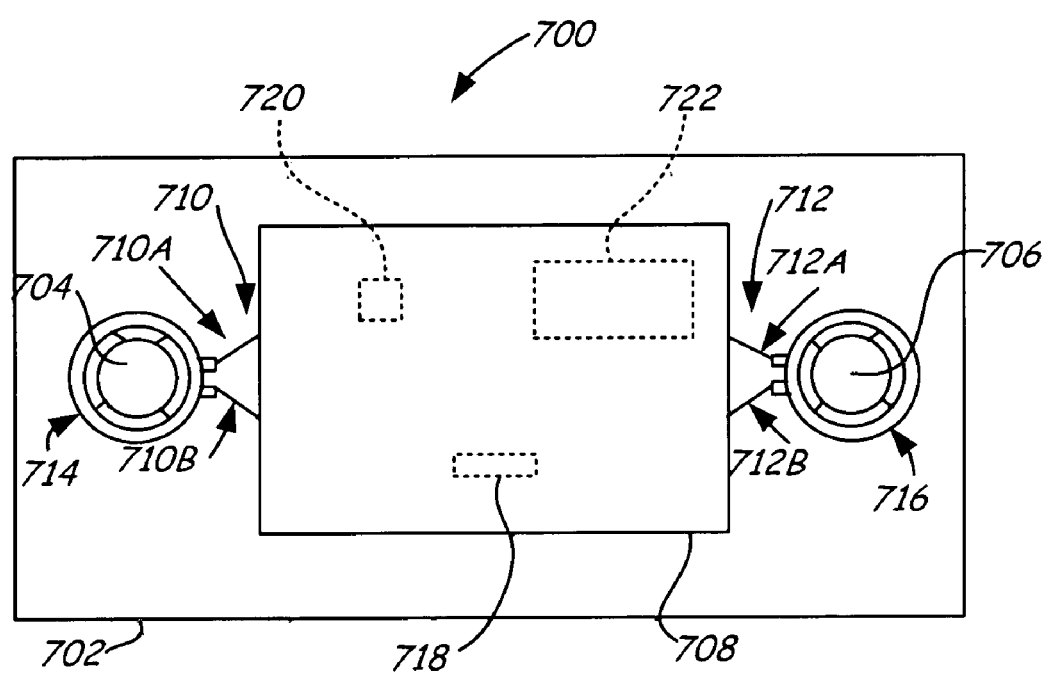
FIGS. 7 and 8 illustrate simplified block diagrams of batteries with integrated testers employing Kelvin connector s in accordance with embodiments of the present invention.

FIG. 7 is a top plan view of battery with an integrated tester with which the present invention is useful. As illustrated in FIG. 7, the integrated system 700 includes a battery 702 with posts 704 and 706 and a test module 708 mounted to the battery housing. A four point or Kelvin connection technique is used to couple battery test module 708 to battery 702. Kelvin connections 710 and 712 are used to couple to battery posts 704 and 706, respectively, of battery 702. Kelvin connection 710 includes two individual connections 710A and 710B. Similarly, Kelvin connection 712 includes two individual connections, 712A and 712B. Post grasping devices 714 and 716 firmly grip battery posts 704 and 706 and couple them to electrical connections 710 and 712. Post grasping devices 714 and 716 are Kelvin connector s (such as 100, 200, 300 and 600) of the present invention, described above. Battery test module 708 includes an optional input 718 and optional outputs 720 and 722. Input 718 can be, for example, a push button or other input which can be actuated by an operator. Output 720 can be, for example, an LED or other type of visual indicator which provides a pass/fail indication of a battery test. Output 720 can also be in the form of a series of outputs which can comprise LEDs. In other aspects, output 722 can be used to send data, using any appropriate technique, to a remote computer or monitoring system. Output 722 can be used to provide a quantitative output of a battery test.

Figure 8:
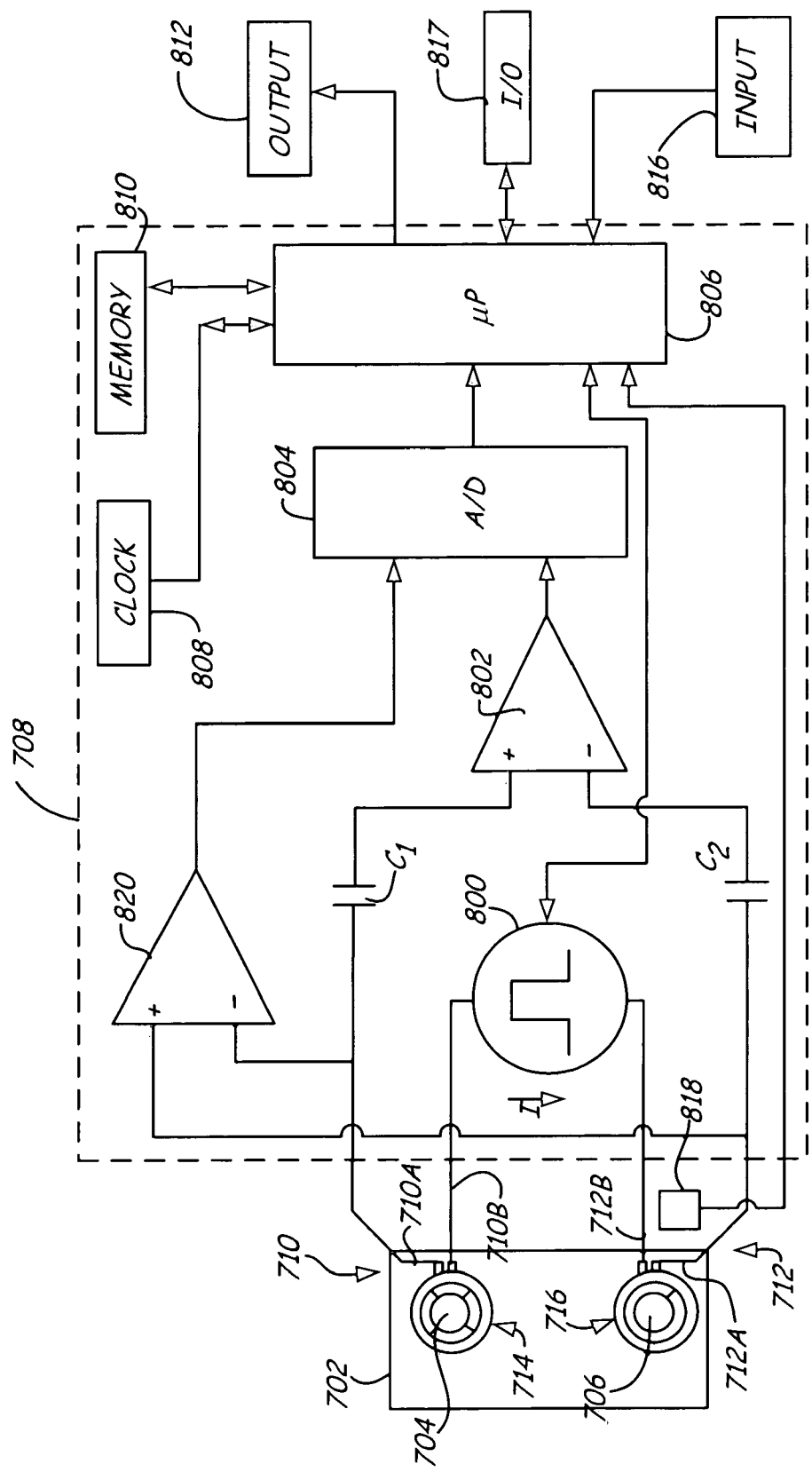

FIG. 8 is a simplified circuit diagram of test module 708. Module 708 is shown coupled to battery 702. Module 708 operates in accordance with one embodiment of the present invention and determines the conductance ($G_{BAT}$) of battery 702 and the voltage potential ($V_{BAT}$) between posts 704 and 706. Module 708 includes current source 800, differential amplifier 802, analog-to-digital converter 804 and microprocessor 806. Amplifier 802 is capacitively coupled to battery 702 through capacitors $C_1$, and $C_2$. Amplifier 802 has an output connected to an input of analog-to-digital converter 804. Microprocessor 806 is connected to system clock 808, memory 810, visual output 812 and analog-to-digital converter 804. Microprocessor 806 is also capable of receiving an input from input device 816. Further, an input/output (I/O) port 817 is provided.

In operation, current source 800 is controlled by microprocessor 806 and provides a current in the direction shown by the arrow in FIG. 8. In one embodiment, this is a square wave or a pulse. Differential amplifier 802 is connected to posts 704 and 706 of battery 702 through capacitors $C_1$ and $C_2$, respectively, and provides an output related to the voltage potential difference between posts 704 and 706. In a preferred embodiment, amplifier 802 has a high input impedance. Circuitry 708 includes differential amplifier 820 having inverting and noninverting inputs connected to posts 704 and 706, respectively. Amplifier 820 is connected to measure the open circuit potential voltage ($V_{BAT}$) of battery 702 between posts 704 and 706. The output of amplifier 820 is provided to analog-to-digital converter 804 such that the voltage across posts 704 and 706 can be measured by microprocessor 806.

As described above, module 708 is connected to battery 702 through a four-point connection technique known as a Kelvin connection. This Kelvin connection allows current I to be injected into battery 702 through a first pair of posts while the voltage V across the posts 704 and 706 is measured by a second pair of connections. Because very little current flows through amplifier 802, the voltage drop across the inputs to amplifier 802 is substantially identical to the voltage drop across posts 704 and 706 of battery 702. The output of differential amplifier 802 is converted to a digital format and is provided to microprocessor 806. Microprocessor 806 operates at a frequency determined by system clock 808 and in accordance with programming instructions stored in memory 810.

Microprocessor 806 determines the conductance of battery 702 by applying a current pulse I using current source 800. The microprocessor determines the change in battery voltage due to the current pulse I using amplifier 802 and analog-to-digital converter 804. The value of current I generated by current source 800 is known and is stored in memory 810. In one embodiment, current I is obtained by applying a load to battery 702. Microprocessor 806 calculates the conductance of battery 702 using the following equation:

$$\text{Conductance} = G_{BAT} = \frac{\Delta I}{\Delta V} \quad \text{Equation 1}$$

where ΔI is the change in current flowing through battery 702 due to current source 800 and ΔV is the change in battery voltage due to applied current ΔI. A temperature sensor 818 can be thermally coupled to battery 702 and used to compensate battery measurements. Temperature readings can be stored in memory 810 for later retrieval.

Battery test module 708 may be built into battery 702 or mounted on battery 702 any time after it is built and coupled to battery posts 704 and 706 using Kelvin connector s 714 and 716 of the present invention.

Although the present invention has been described with reference to preferred embodiments, workers skilled in the art will recognize that changes may be made in form and detail without departing from the spirit and scope of the invention. Embodiments of the Kelvin connector of the present invention can be used to couple different electrical circuits to battery posts other than the tester circuits described above. In addition, although the electrical contacts of the Kelvin connector are shown as opposing each other in FIGS. 1 through 8, the electrical contacts may be positioned in any orientation without departing from the spirit and scope of the invention.

What is claimed is:

1. A Kelvin connector for coupling to a post of a battery, comprising:

a first contact having a surface which at least partially conforms to and is adapted to engage and electrically connect to a surface of such post;

a second contact having a surface which at least partially conforms to and is adapted to engage and electrically connect to the surface of such post; and an electrical insulator between, and at least partially overmolded on, the first contact and the second contact to define an alignment plane that is substantially transverse to such post, to mechanically connect the contacts together and to align the surface of the first contact and the surface of the second contact against the surface of such post and thereby form a Kelvin connection to such post, wherein the first contact, the second contact and the insulator form a closed loop that is used to encircle such battery post; and wherein the first contact and the second contact are substantially horizontally opposed to each other within the alignment plane.

2. The apparatus of claim 1 wherein the first contact comprises:

an insulator support portion which is embedded within the electrical insulator; and a post grasping portion on which the surface of the first contact resides.

3. The apparatus of claim 1 further comprising a first connection bar integral with the first electrical contact and a second connection bar integral with the second electrical contact.

4. The apparatus of claim 1 wherein the first electrical contact and the second electrical contact are formed from electrically conductive sheet metal.

5. The apparatus of claim 1 wherein the first electrical contact and the second electrical contact are copper pieces with solder plating.

6. The apparatus of claim 1 wherein the insulator comprises plastic.

7. The apparatus of claim 1 wherein the insulator comprises a composite material.

* * * * *